United States Patent
Inoue et al.

(10) Patent No.: US 7,167,222 B2
(45) Date of Patent: Jan. 23, 2007

(54) LIQUID CRYSTAL DISPLAY WITH ANTIGLARE LAYER ON VIEWER SIDE HAVING HAZE EQUAL TO OR GREATER THAN 40

(75) Inventors: Iichirou Inoue, Sendai (JP); Motohiro Yamahara, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 65 days.

(21) Appl. No.: 09/810,466

(22) Filed: Mar. 19, 2001

(65) Prior Publication Data

US 2001/0043302 A1 Nov. 22, 2001

(30) Foreign Application Priority Data

Mar. 31, 2000 (JP) ............... 2000-100036
Dec. 25, 2000 (JP) ............... 2000-393483

(51) Int. Cl.
*G02F 1/1335* (2006.01)
*G02F 1/13363* (2006.01)

(52) U.S. Cl. ............ 349/112; 349/117; 349/118; 349/121; 349/137

(58) Field of Classification Search .......... 349/112, 349/137
See application file for complete search history.

(56) References Cited

U.S. PATENT DOCUMENTS

| 5,506,706 A | 4/1996 | Yamahara et al. |
| 5,583,679 A | 12/1996 | Ito et al. |
| 5,619,352 A | 4/1997 | Koch et al. |
| 5,629,784 A * | 5/1997 | Abileah et al. ............ 349/112 |
| 5,844,649 A * | 12/1998 | Yamahara et al. ......... 349/118 |
| 5,949,506 A * | 9/1999 | Jones et al. ............... 349/112 |
| 5,998,013 A * | 12/1999 | Shoshi et al. .............. 428/331 |
| 6,002,464 A * | 12/1999 | Fujisawa et al. .......... 349/112 |
| 6,074,741 A * | 6/2000 | Murata et al. ............. 428/327 |
| 6,084,652 A | 7/2000 | Yamahara et al. |
| 6,097,464 A * | 8/2000 | Liu ........................... 349/130 |
| 6,164,785 A * | 12/2000 | Maekawa ................... 359/613 |
| 6,348,960 B1 * | 2/2002 | Etori et al. ................ 349/112 |
| 6,356,322 B1 | 3/2002 | Shimura |
| 6,483,561 B1 | 11/2002 | Maruyama et al. |

FOREIGN PATENT DOCUMENTS

| EP | 0 936 490 | 8/1999 |
| JP | 02-302725 | 12/1990 |

(Continued)

OTHER PUBLICATIONS

PTO translation of Japanese Patent Document No. 02-302725.*

(Continued)

*Primary Examiner*—Andrew Schechter
(74) *Attorney, Agent, or Firm*—Nixon & Vanderhye P.C.

(57) ABSTRACT

The present invention provides a liquid crystal display device capable of displaying an image with a wide viewing angle and a high color reproducibility. The liquid crystal display device includes a liquid crystal cell, polarizers provided so as to oppose each other via the liquid crystal cell therebetween, a phase compensation element provided between the liquid crystal cell and at least one of the polarizers, and an antiglare layer provided on the viewer side of the polarizer which is provided closer to the viewer.

29 Claims, 8 Drawing Sheets

FOREIGN PATENT DOCUMENTS

| | | |
|---|---|---|
| JP | 07-104127 | 4/1995 |
| JP | 9-120005 A | 5/1997 |
| JP | 09-193332 | 7/1997 |
| JP | 09-230334 | 9/1997 |
| JP | 10-128899 | 5/1998 |
| JP | 10-186109 | 7/1998 |
| JP | 10-239683 | 9/1998 |
| JP | 2822983 | 9/1998 |
| JP | 2866540 B2 | 12/1998 |
| JP | 2000-047010 | 2/2000 |
| JP | 2000-075137 | 3/2000 |

OTHER PUBLICATIONS

"Compensatory Mechanism for Viewing Angle by Optical Compensation Film Based on Inclined Optical Indicatrix for Twisted-Nematic Liquid-Crystal Device", Yamahara et al., 2002.

Korean Office Action mailed Jan. 16, 2004 along with an English translation thereof.

Japanese Office Action mailed Jun. 30, 2002 (w/English Translation).

"Surface Treatment Technology for High Definition LCDs", Kitagawa et al., vol. 40, Sep. 2002 (3pgs).

Japanese Office Action mailed May 6, 2005 (w/partial English translation thereof).

* cited by examiner

LIQUID CRYSTAL DISPLAY WITH ANTIGLARE LAYER ON VIEWER SIDE HAVING HAZE EQUAL TO OR GREATER THAN 40

BACKGROUND OF THE INVENTION

The present invention relates to a liquid crystal display device. More specifically, the present invention relates to a liquid crystal display device with a desirable display quality as viewed from an inclined direction.

In the prior art, liquid crystal display devices using nematic liquid crystal materials have been widely used as segment-type numeric display device in timepieces, calculators, etc. In recent years, they have been widely used in word processors, notebook personal computers, and car navigation systems. The variety of applications of such liquid crystal display devices is still expanding, and they are now used in direct-viewing type large-screen TVs having a diagonal dimension of 20 to 30 inches.

A liquid crystal display device of this type typically includes a pair of substrates opposing each other with a liquid crystal layer interposed therebetween, and electrodes, wired lines, etc., provided on the substrates for turning ON/OFF pixels. An active matrix liquid crystal display device, for example, includes pixel electrodes which are arranged in a matrix pattern for applying voltages across the liquid crystal layer, and active elements such as field effect transistors which are provided on one of the substrates, along with the electrodes and the wired lines, as switching means for selectively applying different potentials to the respective pixel electrodes. Moreover, a liquid crystal display device capable of color display includes a color filter layer provided on one of the substrates. The color filter layer includes color filter portions of different colors such as red, green and blue. The display modes known in the art for use with such a liquid crystal display device can be classified as follows based on the twist angle of the nematic liquid crystal molecules:

(1) Twist nematic liquid crystal display mode (hereinafter, referred to as the "TN mode") in which the twist angle of the nematic liquid crystal molecules is 90° between the pair of substrates; and (2) Super twisted nematic liquid crystal display mode (hereinafter, referred to as the "STN mode") in which the twist angle of the nematic liquid crystal molecules is greater than 90° between the pair of substrates.

liquid crystal display devices of these display modes have a viewing angle dependence due to which a change in the contrast ratio of the displayed image or an inversion phenomenon occurs depending upon the direction (azimuthal angle: direction within the display plane) or angle (vertical angle: direction with respect to the normal to the display plane) from which the viewer observes the display plane (the term "viewing angle dependence" as used herein includes both the azimuthal angle dependence and the vertical angle dependence). This prevents one from obtaining a wide viewing angle characteristic. For example, in the 6 o'clock direction of the display plane (the downward direction defined in the display plane seen as a clockface), the gray level inversion phenomenon may occur even when the vertical angle is slightly inclined. In the 12 o'clock direction (the upward direction), a sufficient contrast ratio may not be obtained, thereby rendering the overall displayed image whitish. Also in the 3 o'clock and 9 o'clock directions (the horizontal directions), the gray level inversion phenomenon may occur, thereby deteriorating the display quality.

In an attempt to solve this problem, Japanese Patent No. 2866540 and Japanese Laid-Open Patent Publication No. 9-120005, for example, disclose a liquid crystal display device employing the combination of a liquid crystal cell of the TN mode as described above and a phase compensation element whose index ellipsoid is inclined. In the disclosed liquid crystal display device, the liquid crystal cell and the phase compensation element are arranged so that the pretilt direction of the liquid crystal molecules in each pixel in the vicinity of an alignment film is opposite to the inclination direction of the principal axis of the index ellipsoid of the phase compensation element. Therefore, the positive uniaxial refractive index anisotropy of the liquid crystal molecules in each pixel which are raised by the applied voltage is compensated for by the negative uniaxial refractive index anisotropy of the phase compensation element. Thus, the refractive index anisotropy of the liquid crystal molecules in the vicinity of the substrate interface which are not raised upon application of a voltage is also effectively optically compensated for. As a result, the gray level inversion phenomenon in the 6 o'clock direction (downward direction) is suppressed, and the contrast ratio in the 12 o'clock direction (upward direction) is also improved, thereby widening the vertical angle in these directions. Moreover, the inversion phenomenon no longer occurs also in the 3 o'clock and 9 o'clock directions (the horizontal directions), thereby widening the vertical angle in these directions. As described above, by using a phase compensation element whose index ellipsoid is inclined, it is possible to widen the vertical angle in the vertical directions (the upward and downward directions) and also in the horizontal directions (the leftward and rightward directions) as viewed from the viewer.

The viewing angle dependence as described above is observed in a TN mode liquid crystal display device in which the pretilt direction of the liquid crystal molecules near the center of the liquid crystal layer along the thickness thereof (so called the "normal viewing direction") is set to be the downward direction (6 o'clock direction). In a typical TN mode liquid crystal display device, the normal viewing direction is set as described above so that the maximum contrast ratio can be obtained when the vertical angle is inclined in the downward direction (the 6 o'clock direction) with respect to the normal to the display plane. It is assumed that the liquid crystal layer of a TN mode liquid crystal display device illustrated herein has such an arrangement unless otherwise noted. That is, the vertical directions include the normal viewing direction and the horizontal directions are perpendicular to the normal viewing direction.

Currently, however, there is a demand for a liquid crystal display device having an even better viewing angle, display quality and color reproducibility, and a sufficient display quality to satisfy such a demand may not be realized by simply combining a TN mode liquid crystal cell with a phase compensation element whose index ellipsoid is inclined as described above.

The above-described conventional liquid crystal display device displays an image by changing the orientation of the liquid crystal layer through voltage application thereacross so as to change the transmittance for light from a light source which is incident upon the liquid crystal layer, thereby obtaining a black, white or intermediate brightness. As described above, the conventional liquid crystal display device has a vertical angle dependence because the apparent retardation value of the liquid crystal layer varies depending upon the vertical angle, and the vertical angle dependence is compensated for by the phase compensation element.

However, the respective retardations of the liquid crystal layer and the phase compensation element each have a wavelength dispersion (wavelength dependence), and the respective wavelength dispersions typically differ from each other. Therefore, in the above-described conventional liquid crystal display device, even if the retardation value of the liquid crystal layer and the retardation value of the phase compensation element are optimized in the normal direction (the direction normal to the display plane) for a white display and an intermediate gray level display, coloring occurs when viewed from an inclined direction (a direction inclined from the normal to the display plane) due to the difference in wavelength dispersion of retardation between the liquid crystal layer and the phase compensation element. Particularly, when the vertical angle is inclined in the 3 o'clock or 9 o'clock direction (horizontal direction), the display image becomes yellowish.

SUMMARY OF THE INVENTION

In view of the above-mentioned problems, the present invention has been devised for the purpose of realizing a liquid crystal display device capable of displaying an image with a wide viewing angle and a high color reproducibility.

A liquid crystal display device of the present invention includes: a liquid crystal cell, the liquid crystal cell including a pair of substrates and a liquid crystal layer provided between the pair of substrates; a pair of polarizers provided so as to oppose each other via the liquid crystal cell therebetween; a phase compensation element provided between the liquid crystal cell and at least one of the pair of polarizers; and an antiglare layer provided on a viewer side of one of the pair of polarizers which is provided closer to a viewer, wherein the antiglare layer is designed so that a specular reflection characteristic thereof for light incident thereupon from the viewer side and a specular transmission characteristic thereof for light transmitted therethrough from the liquid crystal layer to the viewer side satisfy a predetermined relationship, thereby suppressing a reduction in color reproducibility as viewed from a direction inclined from a normal to a display plane. Thus, the above-described object is achieved.

It is preferred that the phase compensation element has an index ellipsoid which has three principal axes, a-axis, b-axis and c-axis, which are orthogonal to one another and three principal refractive indices, na, nb and nc, and wherein na=nc>nb, a-axis is substantially parallel to a layer plane of the liquid crystal layer, and b-axis is inclined with respect to a layer normal of the liquid crystal layer.

It is preferred that the antiglare layer has an internal scattering layer and a scattering surface.

It is preferred that the internal scattering layer includes a polymer matrix and particles dispersed in the polymer matrix, the particles have a scattering center, and a refractive index of the particles and a refractive index of the polymer matrix are different from each other.

It is preferred that a haze value of the antiglare layer is equal to or greater than 15, and more preferably equal to or greater than 25.

It is preferred that a haze value of the antiglare layer is equal to or greater than 40, and more preferably equal to or greater than 50.

It is preferred that the antiglare layer is such that a value of transmitted image clarity is equal to or greater than 10, and more preferably equal to or greater than 15, as measured with an image clarity meter in which a width of an optical comb is 0.5 mm.

It is preferred that a refractive index anisotropy $\Delta n(550)$ of a liquid crystal material of the liquid crystal layer for light having a wavelength of 550 nm is in a range of $0.060 < \Delta n(550) < 0.120$, and more preferably in a range of $0.070 \, \Delta n(550) \, 0.095$.

It is preferred that the phase compensation element is arranged so that b-axis forms an angle in a range of 15° to 75° with respect to a layer normal of the liquid crystal layer.

It is preferred that (na−nb)×d is in a range of 80 nm to 250 nm, where d denotes a thickness of the phase compensation element in a layer normal direction of the liquid crystal layer.

The function of the present invention will now be described.

In the liquid crystal display device of the present invention, the refractive index anisotropy of the liquid crystal layer can be compensated for by the phase compensation element, and the occurrence of a coloring (yellowish coloring or bluish coloring) phenomenon, i.e., the reduction in color reproducibility, which is characteristic of an arrangement using a phase compensation element can be suppressed by the antiglare layer which is provided on the viewer side of the polarizer which is provided closer to the viewer (referred to also as the "upper polarizer"; a "polarizer" as used herein includes a polarizing plate, a polarization film, and the like).

The antiglare layer forwardly scatters light transmitted therethrough with the internal scattering layer and/or the scattering surface to mix together colored light beams of different directions, thereby suppressing the coloring phenomenon. Particularly, when the internal scattering layer includes a polymer matrix and particles dispersed in the polymermatrix, the particles have a scattering center, and the refractive index of the particles and the refractive index of the polymer matrix are different from each other, it is possible to realize an antiglare layer having a good balance between the specular (regular) reflection characteristic and the specular (regular) transmission characteristic. Moreover, by providing the polymer in the form of a matrix, the antiglare layer can be easily produced.

With the antiglare layer designed so that the specular reflection characteristic thereof for light incident thereupon from the viewer side and the specular transmission characteristic thereof for light transmitted therethrough from the liquid crystal layer to the viewer side satisfy a predetermined relationship, it is possible to suppress the image coloring as viewed from an inclined direction while suppressing the interobject reflection of surrounding images due to specular reflection of ambient light and maintaining a high clarity of an image formed by light transmitted in the normal direction, thereby displaying an image with a wide viewing angle and a high quality.

An antiglare layer with an internal scattering layer and a scattering surface has a good balance between the specular reflection characteristic for light incident thereupon from the viewer side and the specular transmission characteristic for light transmitted therethrough from the liquid crystal layer to the viewer side. An antiglare layer having a haze value equal to or greater than 15 has a specular reflection characteristic and a specular transmission characteristic which are in a preferred range, and these characteristics of an antiglare layer having a haze value equal to or greater than 25 are even more desirable.

Particularly, the gray level inversion phenomenon which is observed when a TN or STN mode liquid crystal display device is viewed from a direction inclined toward the normal viewing direction cannot be sufficiently reduced even with a phase compensation element in which a principal axis is inclined. For example, when the vertical angle is inclined from the direction normal to the display plane toward the normal viewing direction, the display quality deteriorates, starting from a vertical angle in the vicinity of 30°. In order to suppress the deterioration in display quality in the normal viewing direction, the haze value of the antiglare layer is preferably equal to or greater than 40, and more preferably equal to or greater than 50.

The optical characteristics (the specular reflection characteristic and the specular transmission characteristic described above) of the antiglare layer suitably used in the liquid crystal display device of the present invention are evaluated in terms of transmitted image clarity which is measured with an image clarity meter. When the value of transmitted image clarity measured with an image clarity meter in which the width of the optical comb is 0.5 mm is equal to or greater than 10, the clarity of an image formed by light transmitted in the normal direction is maintained at a high level. Particularly, with an antiglare layer for which the value of transmitted image clarity is equal to or greater than 15, the clarity of an image formed by light transmitted in the normal direction is further improved.

It is preferred that the refractive index anisotropy $\Delta n(550)$ of the liquid crystal material for light having a wavelength of 550 nm is set to be in the range of $0.060<\Delta n(550)<0.120$. When the refractive index anisotropy $\Delta n(550)$ of the liquid crystal material for light having a wavelength of 550 nm (light of the highest visibility) is outside the range, the inversion phenomenon or reduction in contrast ratio may occur depending upon the vertical angle. By setting the refractive index anisotropy $\Delta n$ (550) of the liquid crystal material for light having a wavelength of 550 nm to be greater than 0.060 and less than 0.120, it is possible to suppress the change in phase difference which is dependent upon the vertical angle, whereby it is possible to further suppress the change in contrast ratio or the inversion phenomenon in the horizontal directions. Moreover, by setting the refractive index anisotropy $\Delta n(550)$ of the liquid crystal material for light having a wavelength of 550 nm in the range of 0.070 $\Delta n(550)$ 0.095, it is possible to more effectively and reliably eliminate the phase difference which is dependent upon the vertical angle, whereby it is possible to more reliably suppress the change in contrast ratio or the inversion phenomenon in the horizontal directions. Also for suppressing the deterioration in display quality in the normal viewing direction in an arrangement employing an antiglare layer whose haze value is equal to or greater than 40, the $\Delta n(550)$ is set preferably in the range of $0.060<\Delta n(550)<0.120$, and more preferably in the range of 0.070 $\Delta n(550)$ 0.095.

In a combination with a liquid crystal layer having a positive uniaxial optical anisotropy, it is preferred that the phase compensation element has an index ellipsoid which has three principal axes, a-axis, b-axis and c-axis, which are orthogonal to one another and three principal refractive indices, na, nb and nc, wherein na=nc>nb, a-axis is substantially parallel to the layer plane of the liquid crystal layer, and b-axis is inclined with respect to the layer normal of the liquid crystal layer.

The inclination angle of b-axis of the index ellipsoid of the phase compensation element with respect to the layer normal of the liquid crystal layer is preferably set to be equal to or greater than 15° and less than or equal to 75°. By setting the inclination angle of the index ellipsoid in this way, it is possible to effectively compensate for the phase difference due to the liquid crystal molecules. It is preferred that the product of the difference between the principal refractive indices na and nb of the phase compensation element with the thickness d thereof, i.e., (na−nb)×d, is set to be equal to or greater than 80 nm and less than or equal to 250 nm. By setting the product of the difference between the principal refractive indices na and nb of the phase compensation element with the thickness d thereof in this way, it is possible to reliably obtain the compensation effect from the phase compensation element.

DETAILED DESCRIPTION OF THE INVENTION

Figure 1:
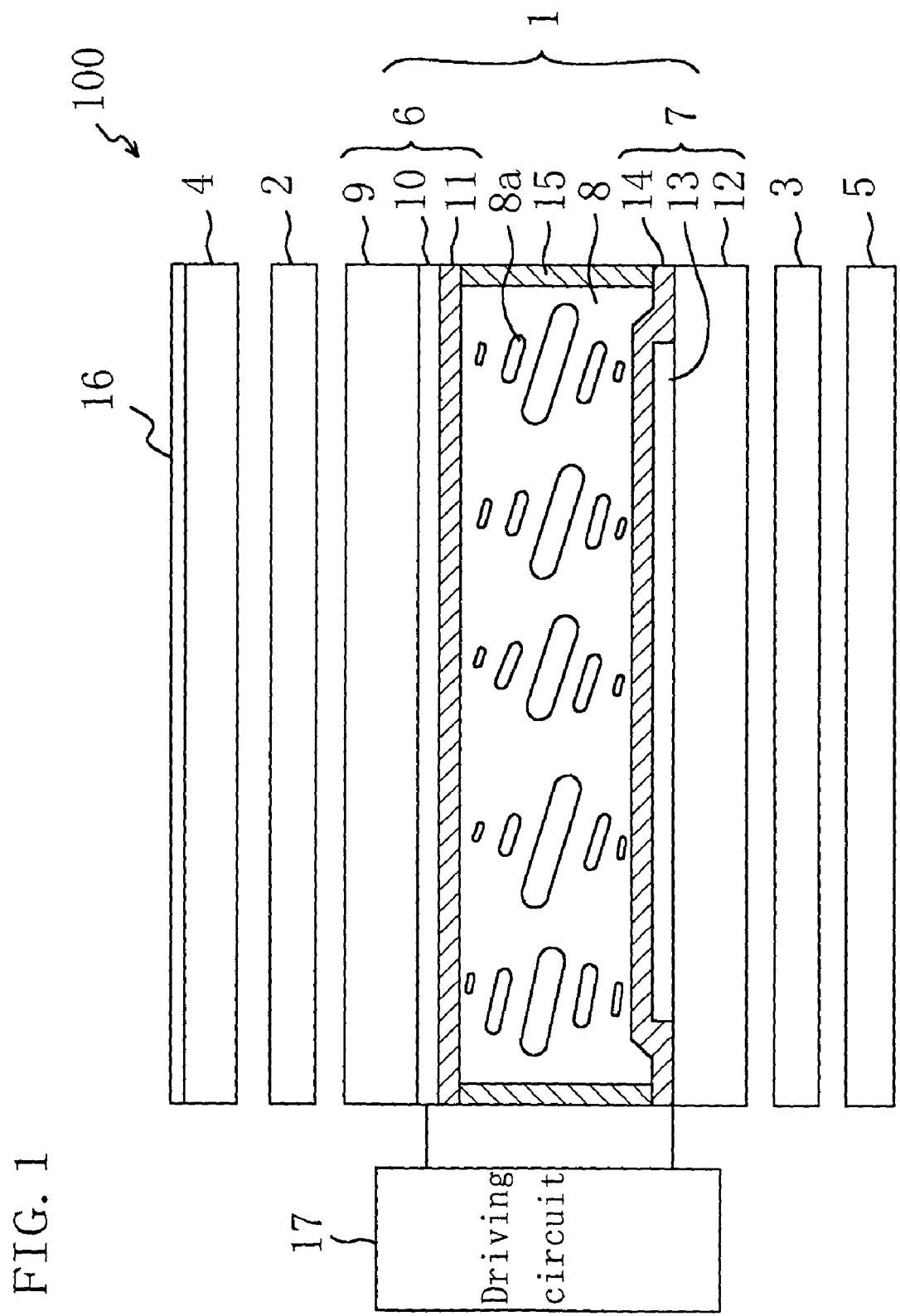
FIG. 1 is a cross-sectional view illustrating a structure of a liquid crystal display device 100 according to one embodiment of the present invention.

Hereinafter, preferred embodiments of the present invention will be described with reference to the accompanying drawings, in which the same reference numerals denote the same components throughout the following embodiments. Note, however, that the present invention is not limited to the following embodiments.

FIG. 1 is a cross-sectional view illustrating a structure of a liquid crystal display device 100 according to one embodiment of the present invention. The liquid crystal display device 100 is a TN mode liquid crystal display device of a normally white mode.

The liquid crystal display device 100 includes a liquid crystal cell 1, polarizing plates 4 and 5 provided so as to oppose each other via the liquid crystal cell 1 therebetween, phase compensation elements 2 and 3 provided between the liquid crystal cell 1 and the polarizing plates 4 and 5, respectively, and an antiglare layer 16 provided on the viewer side of the polarizing plate 4 which is provided closer to the viewer. The liquid crystal display device 100 is driven by a driving circuit 17, and uses light from a backlight (not shown) which is provided under the polarizing plate 5 in FIG. 1, so as to display an image.

The liquid crystal cell 1 includes electrode substrates 6 and 7, and a liquid crystal layer 8 provided between the electrode substrates 6 and 7. The electrode substrate 6 includes a base glass substrate (light transmissive substrate) 9, a transparent electrode 10 made of ITO (indium tin oxide) which is provided on the surface of the glass substrate 9 closer to the liquid crystal layer 8, and an alignment film 11 provided on the transparent electrode 10. The electrode substrate 7 includes a base glass substrate (light transmissive substrate) 12, a transparent electrode 13 made of ITO which is provided on the surface of the glass substrate 12 closer to the liquid crystal layer 8, and an alignment film 14 provided on the transparent electrode 13. The transparent electrodes 10 and 13 are connected to the driving circuit 17.

FIG. 1 only shows the arrangement of one pixel for the sake of simplicity. However, a plurality of transparent electrodes 10 and a plurality of transparent electrode 13 each having a strip shape of a predetermined width are provided on the glass substrates 9 and 12, respectively, at predetermined intervals so as to substantially cover the entire display section of the liquid crystal cell 1. The transparent electrodes 10 on the glass substrate 9 and the transparent electrodes 13 on the other glass substrate 12 are arranged so that they cross each other (orthogonally in this example) as viewed from a direction vertical to the substrate surface. Each intersection between the transparent electrodes 10 and 13 corresponds to a pixel region (a region corresponding to a pixel in a displayed picture). The pixel regions are arranged in a matrix pattern so as to cover the entire surface of the liquid crystal display device.

The electrode substrates 6 and 7 are attached to each other by a seal resin 15, and the space surrounded by the electrode substrates 6 and 7 and the seal resin 15 is filled with the liquid crystal layer 8. A voltage according to display data is applied across the liquid crystal layer 8 from the driving circuit 17 via the transparent electrodes 10 and 13.

The arrangement of the phase compensation elements 2 and 3 will be described with reference to FIG. 2.

Figures 2, 3:
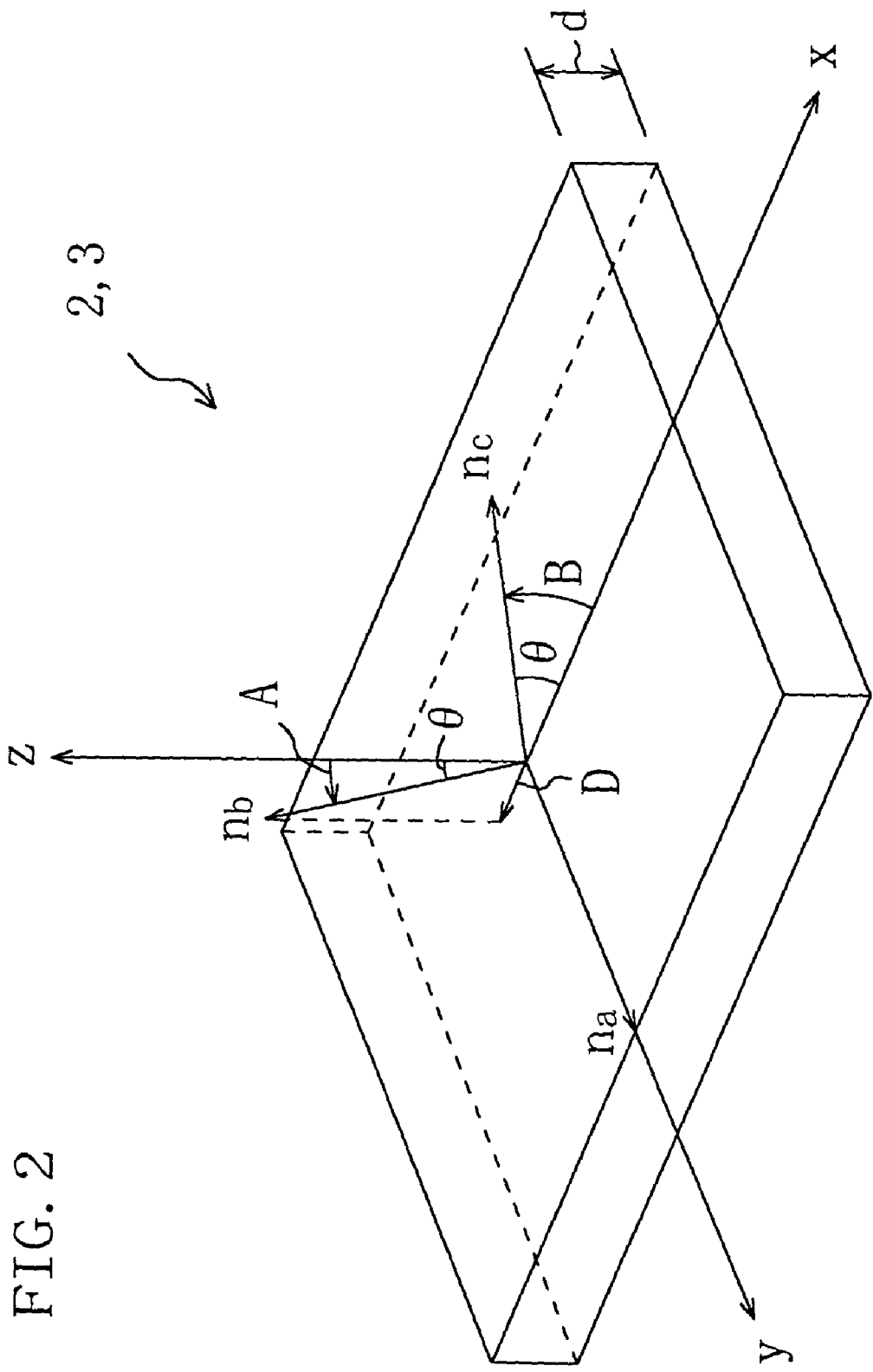
FIG. 2 is a perspective view illustrating the directions of the principal refractive indices of phase compensation elements 2 and 3 in the liquid crystal display device 100.
FIG. 3 is a perspective view illustrating an optical arrangement of a liquid crystal cell 1, the phase compensation elements 2 and 3 and polarizing plates 4 and 5 in the liquid crystal display device 100.
Figure 3:
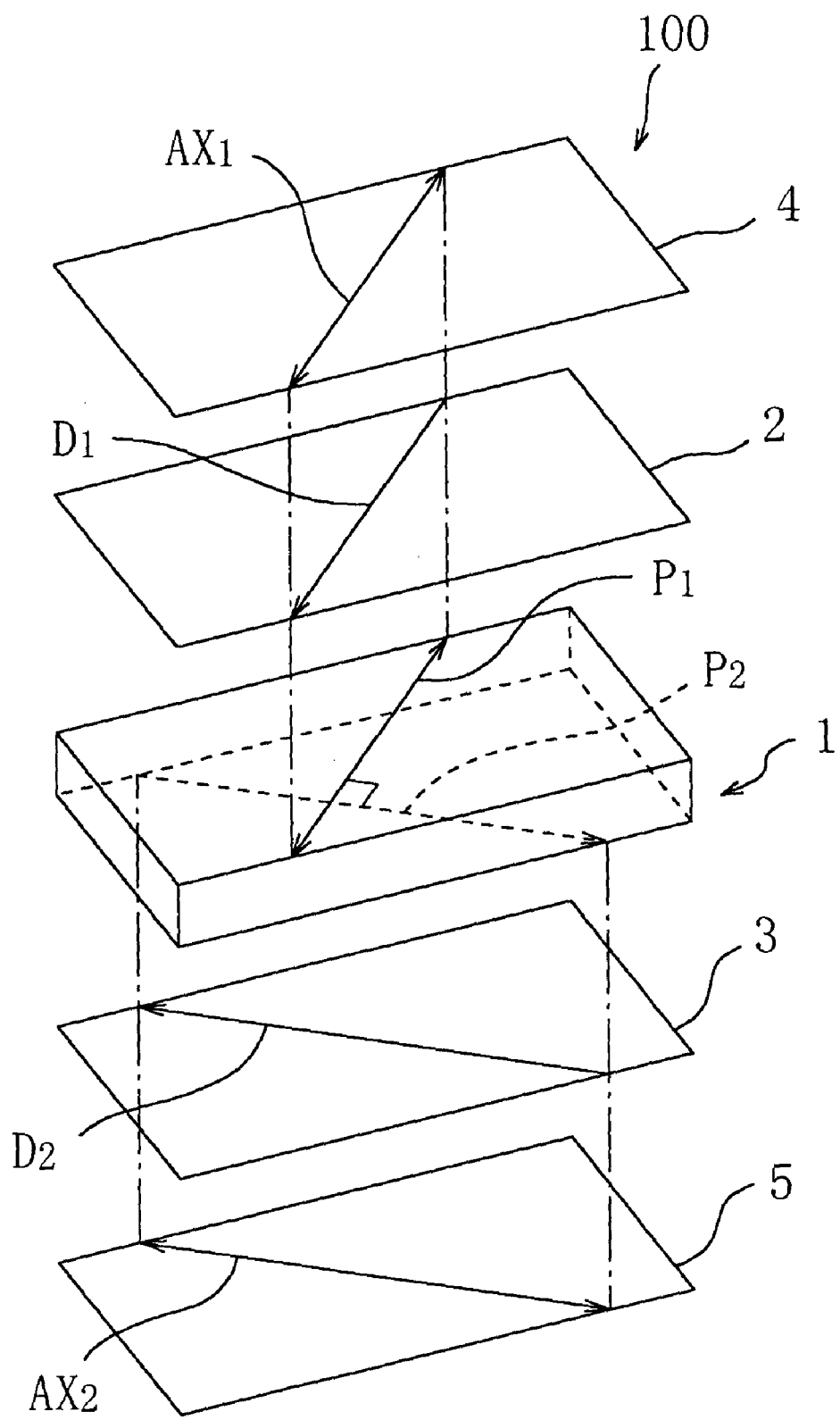

The phase compensation elements 2 and 3 each have three principal refractive indices, na, nb and nc, along the three axes, a-axis, b-axis and c-axis, which are orthogonal to one another (the principal axes of the index ellipsoid) as illustrated in FIG. 2. The xyz coordinate system in FIG. 2 is defined with respect to the phase compensation elements 2 and 3 as they are arranged in the liquid crystal display device 100, wherein the xy plane defines a plane parallel to the layer plane of the liquid crystal layer 8 (which is typically parallel to the substrate surface), and the z axis is parallel to the layer normal of the liquid crystal layer 8 (which typically coincides with the normal to the display plane). Typically, the phase compensation elements 2 and 3 are each in the form of a plate (thus referred to also as a "phase compensation plate") as illustrated in the figure, and the principal plane thereof is arranged to be parallel to the layer plane of the liquid crystal layer 8 (or to the substrate surface). In the following description, a case where the phase compensation plates 2 and 3 are arranged so that the principal planes thereof are parallel to the layer plane of the liquid crystal layer 8 will be discussed for the sake of simplicity.

The phase compensation plates 2 and 3 are arranged so that a-axis coincides with y-axis as illustrated in FIG. 2, for example. In each of the phase compensation plates 2 and 3, b-axis is inclined about a-axis by θ from the z-axis direction in a direction indicated by arrow A (the counterclockwise direction in this example). The c-axis direction is inclined about a-axis by θ from the x-axis direction in a direction indicated by arrow B (the counterclockwise direction in this example). In FIG. 2, D denotes the direction of b-axis (which is inclined in such a direction as to give an anisotropy to the phase compensation plates 2 and 3) as being projected onto the xy plane.

The three principal refractive indices, na, nb and nc, of each of the phase compensation plates 2 and 3 used in the liquid crystal display device 100 have a relationship of na=nc>nb. Thus, the phase compensation plates 2 and 3 are each an uniaxial phase compensation plate having a negative refractive index anisotropy. The first retardation value, which is expressed as the product of the difference between the principal refractive indices na and nc of the phase compensation plates 2 and 3 (the refractive index anisotropy Δn) with the thickness d thereof, i.e., (nc−na)×d, is substantially 0 nm because na=nc. The second retardation value, which is expressed as the product of the difference between the principal refractive indices na and nb of the phase compensation plates 2 and 3 (the refractive index anisotropy Δn) with the thickness d thereof, i.e., (na−nb)×d, is preferably set to be equal to or greater than 80 nm and less than or equal to 250 nm. By setting the second retardation value in this range, it is possible to reliably obtain the phase difference compensation function from the phase compensation plates 2 and 3. The thickness of each of the phase compensation plates 2 and 3 herein denotes a thickness thereof in the direction parallel to the layer normal of the liquid crystal layer 8, i.e., the direction parallel to the normal to the display plane and the principal planes of the phase compensation plates 2 and 3.

In the liquid crystal display device 100 of the present embodiment, the liquid crystal cell 1, the phase compensation plates 2 and 3 and the polarizing plates 4 and 5 are arranged as illustrated in FIG. 3. The absorption axis AX1 of the polarizing plate 4 is arranged so as to be parallel to the rubbing direction P1 of the alignment film 11 which is provided on the same side as the polarizing plate 4 with respect to the liquid crystal layer 8. Similarly, the absorption axis AX2 of the polarizing plate 5 is arranged so as to be parallel to the rubbing direction P2 of the alignment film 14 which is provided on the same side as the polarizing plate 5 with respect to the liquid crystal layer 8.

The phase compensation plate 2 is arranged so that the direction D1 (D in FIG. 2) is parallel to the rubbing direction P1 of the alignment film 11, and the phase compensation plate 3 is arranged so that the direction D2 (D in FIG. 2) is parallel to the rubbing direction P2 of the alignment film 14. The rubbing directions P1 and P2 are orthogonal to each other, and the polarization axes AX1 and AX2 are also orthogonal to each other.

For example, each of the phase compensation plates 2 and 3 is made of a discotic liquid crystal material in an inclined or hybrid orientation held in a matrix (referred to also as a "support") obtained by cross-linking a transparent organic polymer. One of the most suitable matrix materials for the phase compensation plates 2 and 3 is triacetylcellulose (TAC), which is commonly used as a material of a polarizing plate. With such a matrix material, a reliable phase compensation plate can be obtained. Other materials suitable for this purpose include an organic polymer film which is excellent in terms of environment resistance and chemical resistance, such as polycarbonate (PC) and polyethylene terephthalate (PET).

Next, the structure and function of the antiglare layer 16 will be described with reference to FIG. 4.

The antiglare layer 16 suppresses the occurrence of a coloring (typically, yellowish coloring or bluish coloring) phenomenon, i.e., the reduction in color reproducibility, which is characteristic of an arrangement using a phase compensation element. The antiglare layer 16 is designed so that the specular reflection characteristic thereof for light incident thereupon from the viewer side and the specular transmission characteristic thereof for light transmitted therethrough from the liquid crystal layer 8 to the viewer side satisfy a predetermined relationship, thereby maintaining a high clarity of an image formed by light transmitted in the normal direction while suppressing the interobject reflection of surrounding images due to specular reflection of ambient light. As a result, the image coloring as viewed from an inclined direction in a horizontal direction (a direction perpendicular to the normal viewing direction) is suppressed, thereby displaying an image with a wide viewing angle and a high quality.

Figure 4:
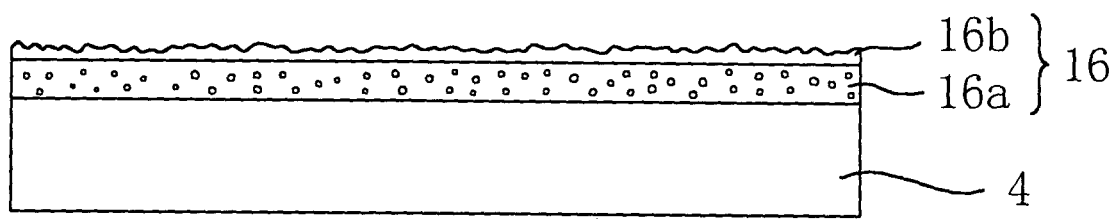
FIG. 4 is a cross-sectional view illustrating a structure of an antiglare layer 16 in the liquid crystal display device 100.

The antiglare layer 16 includes, for example, an internal scattering layer 16a and a scattering surface 16b as illustrated in FIG. 4. The internal scattering layer 16a is made of, for example, a material obtained by dispersing and mixing in a polymer matrix minute particles (a filler) having a refractive index which is different from that of the polymer matrix, and scatters (or diffuse-reflects) light transmitted through the internal scattering layer 16a. The scattering surface 16b is a surface having concave/convex portions, and scatters ambient light which is incident thereupon primarily from the viewer side. The scattering surface 16b can be obtained by forming the concave/convex portions on the surface of the internal scattering layer 16a. Alternatively, the scattering surface 16b can be obtained by providing another film on the surface of the internal scattering layer 16a and then forming the concave/convex portions on the surface of the film as illustrated in FIG. 4.

The internal scattering layer 16a can be obtained, for example, by curing a material which is obtained by dispersing and mixing in a UV curable resin (e.g., an acrylate monomer, a cellulose derivative, or a mixture thereof) about 10 to 30 parts by weight of a filler (e.g., minute silica particles having a uniform particle diameter).

As described above, the antiglare layer 16 having the internal scattering layer 16a and the scattering surface 16b has a good balance between the specular reflection characteristic for light incident thereupon from the viewer side and the specular transmission characteristic for light transmitted therethrough from the liquid crystal layer 8 to the viewer side. When the intensity of specularly-reflected light from the surface of the liquid crystal display device 100 is high, the viewer sees surrounding images formed by ambient light thereon, as on a mirror surface. When the intensity of specularly-transmitted light which is transmitted through the liquid crystal layer 8 in parallel to the layer normal is low, the display from the liquid crystal layer 8 is blurred. A high display quality can be realized by controlling the above-described characteristics of the antiglare layer 16 in a well-balanced manner.

The function of the antiglare layer 16 of the present invention will now be described in greater detail.

The liquid crystal molecules in the liquid crystal layer, excluding those in the vicinity of the inner surface of the liquid crystal cell, are oriented at a certain angle with respect to the inner surface of the liquid crystal cell whether in the absence of an applied voltage or in the presence of an appropriate applied voltage. "Being oriented at a certain angle" as used herein refers to not only the state of being inclined with respect to the inner surface of the liquid crystal cell, but also a state of being oriented substantially parallel or perpendicular to the inner surface of the liquid crystal cell.

The viewer observes the liquid crystal layer from a vertical angle $\alpha$, which is a direction inclined from the normal to the liquid crystal cell surface (a direction inclined from the normal to the display plane). Without the antiglare layer, the viewer only views a portion of light incident upon the liquid crystal cell from the light source which passes through the liquid crystal layer in a direction inclined from the normal direction by the vertical angle $\alpha$. Therefore, the retardation value of the liquid crystal layer for the light viewed by the viewer is constant. As a result, the coloring phenomenon occurs due to the difference in wavelength dispersion of retardation value between the phase compensation element and the liquid crystal layer.

In contrast, with the antiglare layer, light passing through the liquid crystal layer is forwardly scattered by the antiglare layer, whereby the viewer observing the liquid crystal layer from a direction at the vertical angle a views not only light passing through the liquid crystal layer in a direction inclined from the normal direction by the vertical angle $\alpha$, but also views, at the same time, light passing through the liquid crystal layer at various angles other than the vertical angle $\alpha$. Since the retardation value of the liquid crystal layer varies for different light beams passing through the liquid crystal layer at different angles, the different light beams passing at different angles have different color tones (different chromaticity values in the chromaticity diagram). Therefore, with the antiglare layer, the viewer, even when viewing the liquid crystal layer from a fixed vertical angle $\alpha$, views a plurality of light beams passing through the liquid crystal layer at different angles. As a result, the viewer observes light having a color tone (a chromaticity value in the chromaticity diagram) obtained by averaging different color tones (different chromaticity values in the chromaticity diagram).

Therefore, it is possible to realize a liquid crystal display device having a desirable color reproducibility with a good white balance whereby coloring does not occur in an inclined direction (a direction inclined from the normal to the display plane) while providing a high contrast and a wide viewing angle characteristic, by appropriately selecting a phase compensation element which can improve the viewing angle characteristic of the liquid crystal display device depending upon the display mode and the application thereof, and by suitably setting the specular reflection characteristic and the specular transmission characteristic of the antiglare layer in view of the wavelength dispersion of the retardation value of the selected phase compensation element and that of the liquid crystal layer.

The antiglare layer 16 whose haze value is equal to or greater than 15 has a specular reflection characteristic and a specular transmission characteristic which are in a preferred range, and these characteristics of the antiglare layer 16 whose haze value is equal to or greater than 25 are even more desirable. Particularly, it is possible to effectively suppress the coloring phenomenon which is observed on a TN or STN mode liquid crystal display device when the vertical angle is inclined to a horizontal direction. Moreover, with the antiglare layer 16 whose haze value is equal to or greater than 40, it is possible to suppress the deterioration in display quality (typically, the gray level inversion of a black display) which is observed on a TN or STN mode liquid crystal display device when the vertical angle is inclined in the normal viewing direction. In order to suppress the vertical angle dependence of the display quality in the normal viewing direction, it is more preferred to use the antiglare layer 16 whose haze value is equal to or greater than 50.

The optical characteristics (the specular reflection characteristic and the specular transmission characteristic as described above) of the antiglare layer 16 suitably used in the liquid crystal display device 100 are evaluated in terms of transmitted image clarity which is measured with an image clarity meter. When the value of transmitted image clarity measured with an image clarity meter in which the width of the optical comb is 0.5 mm is equal to or greater than 10, the clarity of an image formed by light transmitted in the normal direction is maintained at a high level. Particularly, with an antiglare layer for which the value of transmitted image clarity is equal to or greater than 15, the clarity of an image formed by light transmitted in the normal direction is further improved.

The refractive index anisotropy $\Delta n(550)$ of the liquid crystal material of the liquid crystal layer 8 for light having a wavelength of 550 nm is preferably in the range of $0.060<\Delta n(550)<0.120$. When the refractive index anisotropy $\Delta n(550)$ of the liquid crystal material for light having a wavelength of 550 nm (light of the highest visibility) is outside the range, the inversion phenomenon or the reduction in contrast ratio may occur depending upon the vertical angle. When the refractive index anisotropy $\Delta n(550)$ of the liquid crystal material for light having a wavelength of 550 nm is in the range of $0.060<\Delta n(550)<0.120$, it is possible to reduce the phase difference dependent upon the vertical angle, whereby it is possible to more effectively suppress the variation in contrast ratio or the inversion phenomenon in the horizontal directions. Moreover, when the refractive index anisotropy $\Delta n(550)$ of the liquid crystal material for light having a wavelength of 550 nm is in the range of 0.070 $\Delta n(550)$ 0.095, it is possible to more effectively and reliably reduce the phase difference dependent upon the vertical angle, whereby it is possible to more reliably suppress the variation in contrast ratio and the inversion phenomenon in the horizontal directions and in the normal viewing direction.

The liquid crystal material used in the present embodiment is a nematic liquid crystal material having a positive dielectric anisotropy and a positive refractive index anisotropy, and forms a liquid crystal layer of a horizontal orientation type. A horizontal orientation liquid crystal layer is a liquid crystal layer in which the liquid crystal molecules are oriented parallel (ignoring slight pretilt angles) to the surface of the substrate in the absence of an applied voltage, and is not limited to the TN or STN mode described above. Nevertheless, significant effects can be obtained when the present invention is used with a liquid crystal display device having a twist orientation liquid crystal layer such as those of the TN or STN mode.

It is preferred that the inclination angle of b-axis of the index ellipsoid of the phase compensation element with respect to the layer normal of the liquid crystal layer is set to be equal to or greater than 15° and less than or equal to 75°. By setting the inclination angle of the index ellipsoid in this way, it is possible to effectively compensate for the phase difference due to the liquid crystal molecules. It is preferred that the product of the difference between the principal refractive indices na and nb of the phase compensation element with the thickness d thereof, i.e., (na−nb)×d, is set to be equal to or greater than 80 nm and less than or equal to 250 nm. By setting the product of the difference between the principal refractive indices na and nb of the phase compensation element with the thickness d thereof in this way, it is possible to reliably obtain the compensation effect from the phase compensation element.

The liquid crystal display device of the present invention will now be described with more specific embodiments.

Embodiment 1

In Embodiment 1, Samples (specific examples) A11 to A14 were prepared. Each of Samples A11 to A14 was obtained by providing the antiglare layer 16 having a haze value as shown in Table 1 below on the viewer side of the polarizing plate 4 in the liquid crystal display device 100 as illustrated in FIG. 1. OPTMER AL manufactured by JSR Corporation was used for the alignment films 11 and 14 of the liquid crystal cell 1, and the thickness of the liquid crystal cell 1 (the thickness of the liquid crystal layer 8) was set to be 5 μm. A liquid crystal material whose refractive index anisotropy $\Delta n(550)$ for light having a wavelength of 550 nm is 0.080 was used for the liquid crystal layer 8. As reference examples, Samples A201 and A202 were prepared with the antiglare layer 16 thereof having the respective values shown in Table 1 below. The haze value is herein defined as a percentage of the diffused light transmittance with respect to the total light beam transmittance. The values shown herein were obtained with a hazemeter manufactured by Nippon Denshoku Industries Co., Ltd.

A phase compensation plate in which a discotic liquid crystal material was oriented in an inclined orientation was used for the phase compensation plates 2 and 3. In the produced phase compensation element, the first retardation value (nc−na)×d was 0 nm, the second retardation value (na−nb)×d was 100 nm, and the inclination angle θ of the index ellipsoid was about 20° (the direction of the principal refractive index nb as shown in FIG. 2 was inclined by about 20° from the z-axis direction of the xyz coordinate system in the direction indicated by arrow A, and the direction of the principal refractive index nc was inclined by about 20° from the x-axis direction in the direction indicated by arrow B). The same phase compensation element was used in Embodiments 2 and 3 to be described later.

TABLE 1

| Sample | A11 | A12 | A13 | A14 | A201 | A202 |
|---|---|---|---|---|---|---|
| Haze value | 15.5 | 25.0 | 30.3 | 38.7 | 0.40 | 9.05 |

Table 2 below shows the results of a visual observation of the anti-interobject reflection property and the image coloring in the horizontal directions for Samples A11 to A14 and Reference Samples A201 and A202.

TABLE 2

| Sample | A11 | A12 | A13 | A14 | A201 | A202 |
|---|---|---|---|---|---|---|
| Anti-interobject reflection property | 4 | 4 | 5 | 5 | 1 | 3 |
| Image coloring | ○ | ◎ | ◎ | ◎ | x | Δ |

The evaluation criteria used in the visual observation of the anti-interobject reflection property and the image coloring in Table 2 are as follows.

<Anti-interobject Reflection Property>

5: Reflected image not observed at all

4: Reflected image not observed

3: Slight reflected image observed, though blurred

2: Reflected image observed, though blurred

1: Reflected image clearly observed

<Image Coloring>
⊚: No coloring observed
○: Slight coloring observed
Δ: Coloring observed
X: Significant coloring observed Table 3 below shows the results of an evaluation of the color reproducibility of a displayed image in terms of chromaticity values (x, y) for the liquid crystal display devices of Samples A11 and A14 and Reference Sample A202 when the vertical angle was inclined in a horizontal direction by 50° and 60°. The chromaticity values were measured with BM-7 manufactured by TOPCON Corporation.

TABLE 3

| | Sample | | | | | |
|---|---|---|---|---|---|---|
| | A11 | | A14 | | A202 | |
| Chromaticity value | x | y | x | y | x | y |
| 50° | 0.3581 | 0.3675 | 0.3558 | 0.3647 | 0.3609 | 0.3695 |
| 60° | 0.3647 | 0.3650 | 0.3587 | 0.3612 | 0.3700 | 0.3696 |

Table 3 shows that Samples A11 and A14 of the present embodiment have smaller chromaticity values (x, y), both x and y, than those of Reference Sample A202, as measured when the vertical angle is inclined by 50° and 60° in the horizontal direction. Since the direction in which the values of x and y increase is the direction toward yellow in the chromaticity diagram, and the direction in which the values of x and y decrease is the direction toward blue in the chromaticity diagram, it can be seen that the yellowish coloring occurring when the vertical angle is inclined in a horizontal direction is suppressed for the samples of the present embodiment. This shows that the color reproducibility is not reduced when the vertical angle is inclined.

It can also be seen that the yellowish coloring is more suppressed for Sample A14 than for Sample A11. Since a human eye can perceive a difference in color tone when there is a difference in the x and y values as much as 0.005, it can be said that the yellowish coloring occurring when the vertical angle is inclined in a horizontal direction is suppressed for Samples A11 and A14 of the present embodiment. It can be seen that the yellowish coloring is even more suppressed for Sample A14.

As can be seen from Tables 2 and 3, it was confirmed through both visual observation and measurement that the image coloring occurring when the liquid crystal display device is viewed from a horizontal direction is suppressed for Samples A11 to A14 of Embodiment 1, indicating that the samples provide a desirable display quality. It can be seen that the image coloring is more suppressed for Samples A12 to A14, thereby displaying an image with an even higher quality.

Thus, it can be seen that the haze value of the antiglare layer 16 provided on the surface of the upper polarizing plate 4 is preferably equal to or greater than 15, and more preferably equal to or greater than 25, in order to suppress the image coloring (in the horizontal directions) which is characteristic of an arrangement using a phase compensation plate.

It will be shown below that the display quality in the normal viewing direction can be improved by producing the liquid crystal display device 100 with the antiglare layer 16 having a haze value equal to or greater than 40.

Samples B11 to B15 were prepared in a manner similar to that described above except that the antiglare layers 16 having respective haze values as shown in Table 4 below were used. For comparison, Reference Samples B201 and B202 were prepared with the antiglare layers 16 having haze values less than or equal to 40.

TABLE 4

| Sample | B11 | B12 | B13 | B14 | B15 | B201 | B202 |
|---|---|---|---|---|---|---|---|
| Haze value | 41.0 | 45.5 | 50.1 | 63.7 | 70.8 | 10.5 | 35.3 |

Figure 5:
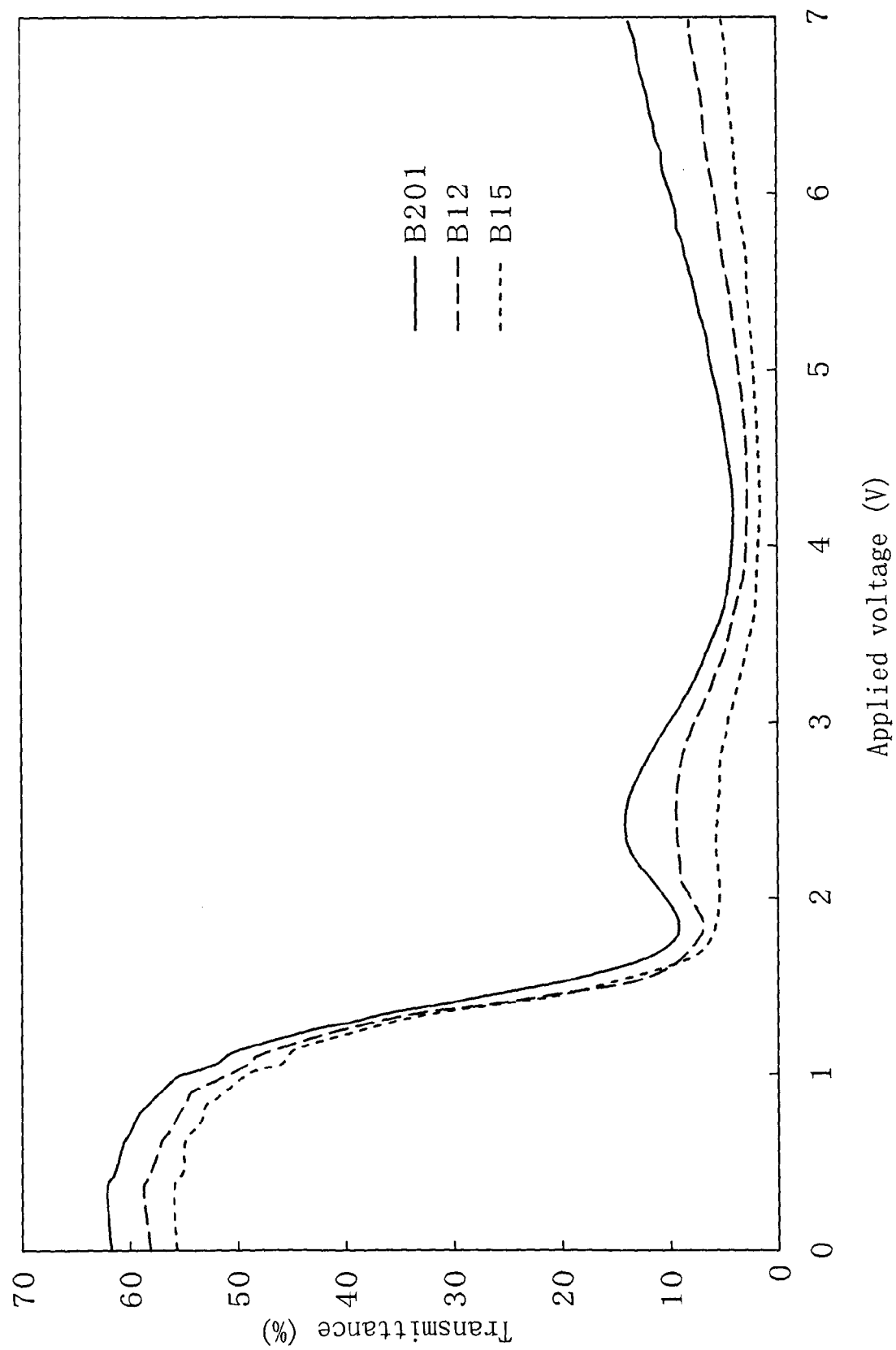
FIG. 5 is a graph illustrating the applied voltage versus transmittance characteristics of a liquid crystal display device according to one embodiment of the present invention and those of other liquid crystal display devices of reference examples.

Table 5 below shows the results of a visual observation of the image coloring for Samples B11 to B15 and Reference Samples B201 and B202 when the vertical angle was inclined in the normal viewing direction (the downward direction) by 50°, 60° and 70°. Table 6 below shows the results of an evaluation of the color reproducibility of a displayed image in terms of chromaticity values (x, y) for a vertical angle of 60°. In Table 5, symbol "○" indicates "no coloring observed", symbol "Δ" indicates "coloring observed, though within acceptable range", and symbol "x" indicates "coloring observed to degree over acceptable range". FIG. 5 shows applied voltage versus transmittance characteristics (V-T characteristics) for a vertical angle of 50° in the normal viewing direction for Samples B12, B15 and Reference Sample B201.

TABLE 5

| Sample | B11 | B12 | B13 | B14 | B15 | B201 | B202 |
|---|---|---|---|---|---|---|---|
| 50° | ○ | ○ | ○ | ○ | ○ | x | x |
| 60° | x | Δ | ○ | ○ | ○ | x | x |
| 70° | x | x | ○ | ○ | ○ | x | x |

TABLE 6

| Sample | B11 | B12 | B13 | B14 | B15 | B201 | B202 |
|---|---|---|---|---|---|---|---|
| x | 0.3610 | 0.3602 | 0.3584 | 0.3543 | 0.3512 | 0.3696 | 0.3661 |
| y | 0.3650 | 0.3643 | 0.3637 | 0.3600 | 0.3579 | 0.3710 | 0.3703 |

Table 5 shows that no coloring was observed when the vertical angle was inclined by 50° in the normal viewing direction for Samples B11 to B15, indicating that the samples provide a desirable display quality. Particularly for Samples B13 to B15, no coloring was observed even when the vertical angle was inclined by 70°, and the vertical angle characteristic in the normal viewing direction was very good. In contrast, for Reference Samples B201 and B202, significant coloring was observed when the vertical angle was inclined by 50°, indicating that the vertical angle dependence of the display quality in the normal viewing direction was not sufficiently suppressed for these reference samples.

Table 6 shows that Samples B11 to B15 have chromaticity values x and y smaller than those of Reference Sample B201 by 0.0086 or more and 0.0060 or more, respectively, indicating that the yellowish coloring is suppressed for these samples. Samples B11 to B15 of the present embodiment have chromaticity values x and y smaller than those of Reference Sample B202 by 0.0051 or more and 0.0053 or more, respectively, indicating that the yellowish coloring is suppressed for these samples.

Particularly, Samples B13 to B15 have chromaticity values x and y smaller than those of Reference Sample B201 by 0.0112 or more and 0.0073or more, respectively, and have chromaticity values x and y smaller than those of Reference Sample B202 by 0.0077 or more and 0.0066 or more, respectively, indicating that the yellowish coloring is even more suppressed for these samples.

Moreover, based on FIG. 5, it can be said that the gray level inversion phenomenon in the normal viewing direction is suppressed for Samples B12 and B15 as compared to Reference Sample B201. Particularly for Sample B15, substantially no rise (local increase) in transmittance was observed in the presence of applied voltages ranging from a voltage near an intermediate gray level voltage to a voltage near a black display voltage, indicating that the gray level inversion phenomenon is even more suppressed for the sample.

Thus, by using the antiglare layer 16 having a haze value equal to or greater than 40 (Samples B11 to B15), it is possible to effectively suppress the vertical angle dependence of the display quality in the normal viewing direction (gray level inversion phenomenon or coloring). The haze value is preferably equal to or greater than 50 (Samples B13 to B15), and more preferably equal to or greater than 70 (Sample B15).

Embodiment 2

As described above, by providing an antiglare layer having a large haze value, it is possible to reduce the vertical angle dependence of the display quality. However, a displayed image may appear blurred depending upon the antiglare layer used. In Embodiment 2, an antiglare layer with which the image clarity can be maintained at a sufficiently high level will be described.

As in Embodiment 1, Samples (specific examples) A21 to A24 were prepared. Each of Samples A21 to A24 was obtained by providing the antiglare layer 16 having a value of transmitted image clarity as shown in Table 7 below on the viewer side of the polarizing plate 4 in the liquid crystal display device 100 as illustrated in FIG. 1. As reference examples, Samples A301 and A302 were prepared with the antiglare layer 16 thereof having the respective values shown in Table 7 below. All of the antiglare layers of these samples and reference samples had a haze value equal to or greater than 10 and less than 40.

The transmitted image clarity was measured with an image clarity meter (manufactured by Suga Test Instruments Co., Ltd.) in which the width of the optical comb was 0.5 mm. The measurement method will now be described.

The image clarity meter includes an optical device for passing light through a slit to make parallel light beams so that the parallel light beams are incident upon a sample in the vertical direction so as to detect the transmitted light through a moving optical comb, and a measurement device for recording the fluctuations in the detected amount of light as a waveform. The optical comb has a width ratio of 1:1 between the dark portion and the light portion. Five different optical comb widths of 0.125 mm, 0.25 mm, 0.5 mm, 1.0 mm and 2.0 mm are used, and the speed thereof is set to about 10 mm/min. Where M denotes the maximum value of the intensity of light transmitted through the light portion of the optical comb and m denotes the minimum value of the intensity of light transmitted through the dark portion of the optical comb, the transmitted image clarity C(%) can be given by the following expression:

$$C = \{(M-m)/(M+m)\} \times 100$$

The values of transmitted image clarity used herein are those measured with an optical comb width of 0.5 mm. It was experimentally confirmed that the such values were most consistent with the results of a visual observation performed by observing a liquid crystal panel with a magnifying glass.

TABLE 7

| Sample | A21 | A22 | A23 | A24 | A301 | A302 |
|---|---|---|---|---|---|---|
| Transmitted image clarity | 10.5 | 15.0 | 23.8 | 64.5 | 4.0 | 7.5 |

Table 8 shows the results of a visual observation of the anti-interobject reflection property and the transmitted image clarity in the normal direction for Samples A21 to A24 and Reference Samples A301 and A302.

TABLE 8

| Sample | A21 | A22 | A23 | A24 | A301 | A302 |
|---|---|---|---|---|---|---|
| Anti-interobject reflection property | 5 | 4 | 3 | 2 | 5 | 5 |
| Transmitted image clarity | ○ | ◎ | ◎ | ◎ | x | Δ |

The evaluation criteria used for the anti-interobject reflection property in Table 8 are the same as those described above in Embodiment 1. The evaluation criteria for the visual observation of the transmitted image clarity are as follows:

<Transmitted Image Clarity>

The samples were evaluated based on the following four criteria by observing a pixel of each liquid crystal display device with a magnifying glass, or the like.

◎: Boundary of pixel can be recognized

○: Boundary of pixel can be recognized, though slightly blurred

Δ: Boundary of pixel cannot be recognized, being slightly blurred

X: Boundary of pixel cannot be recognized

While the magnification used in such an observation depends upon the resolution of the liquid crystal display device, a magnification of about 100 was used for XGA, for example.

As can be seen from Table 8, for Samples A21 to A24 of Embodiment 2, the boundary of a pixel can be recognized by visually observing light transmitted in the normal direction with a magnifying glass, or the like, indicating that the clarity of an image formed by light transmitted in the normal direction is maintained at a high level. Particularly for Samples A22 to A24, the boundary of a pixel can be recognized without being blurred by visually observing light transmitted in the normal direction with a magnifying glass, or the like, indicating that the clarity of an image formed by light transmitted in the normal direction is maintained at a higher level. This shows that in order to maintain the clarity of an image formed by light transmitted in the normal direction at a high level, the value of transmitted image clarity of the antiglare layer as measured with an image clarity meter in which the width of an optical comb is 0.5 mm is preferably equal to or greater than 10, and more preferably equal to or greater than 15.

The results of a similar evaluation of the transmitted image clarity with the antiglare layer 16 having a haze value equal to or greater than 40 will be discussed below. Samples B21 to B25 and Reference Sample B301 and B302 were prepared having the same structure as those of the above-described samples except that the antiglare layers 16 having respective haze values as shown in Table 9 below were used.

TABLE 9

| Sample | B21 | B22 | B23 | B24 | B25 | B301 | B302 |
|---|---|---|---|---|---|---|---|
| Transmitted image clarity | 10.2 | 13.6 | 15.0 | 28.9 | 39.5 | 3.4 | 7.8 |

Table 10 below shows the results of a visual observation of the clarity of an image formed by light transmitted in the normal direction for Samples B21 to B25 and Reference Samples B301 and B302.

The criteria for the visual observation were as follows.
6: Boundary of pixel can be recognized clearly
5: Pixel can be recognized
4: Boundary of pixel can be recognized, though slightly blurred
3: Boundary of pixel cannot be recognized, being slightly blurred
2: Pixel cannot be recognized
1: Pixel cannot be recognized at all

TABLE 10

| Sample | B21 | B22 | B23 | B24 | B25 | B301 | B302 |
|---|---|---|---|---|---|---|---|
| Transmitted image clarity | 4 | 5 | 6 | 6 | 6 | 1 | 2 |

Table 10 shows that the boundary of a pixel can be recognized and the transmitted image clarity is maintained at a high level for Samples B21 to B25 of the present embodiment. Particularly for Samples B23 to B25 of the present embodiment, the boundary of a pixel can be recognized clearly, indicating a high transmitted image clarity. In contrast, for Reference Samples B301 and B302, the boundary of a pixel cannot be recognized, indicating a low transmitted image clarity.

Thus, it can be seen that in order to maintain the clarity of an image formed by light transmitted in the normal direction at a high level, the value of transmitted image clarity is preferably equal to or greater than 10, and more preferably equal to or greater than 15, with an antiglare layer having a haze value equal to or greater than 40.

Embodiment 3

In Embodiment 3, OPTMERAL manufactured by JSR Corporation was used for the alignment films 11 and 14 of the liquid crystal cell 1 of the liquid crystal display device 100 illustrated in FIG. 1, and the thickness of the liquid crystal cell 1 (the thickness of the liquid crystal layer 8) was set to be 5 μm. Three Samples A31, A32 and A33 were produced in which the refractive index anisotropy Δn(550) of the liquid crystal material of the liquid crystal layer 8 for light having a wavelength of 550 nm was 0.070, 0.080 and 0.095, respectively. Samples A31, A32 and A33 used the antiglare layers 16 having respective haze values and transmitted image clarity values as shown in Table 11 below.

For comparison, Reference Samples A401 and A402 were produced in which the refractive index anisotropy Δn(550) of the liquid crystal material of the liquid crystal layer 8 of the liquid crystal display device 100 as illustrated in FIG. 1 for light having a wavelength of 550 nm was set to be 0.060 and 0.120, respectively. Reference Samples A401 and A402 used the antiglare layers 16 having respective haze values and transmitted image clarity values as shown in Table 11 below.

TABLE 11

| Sample | A31 | A32 | A33 | A401 | A402 |
|---|---|---|---|---|---|
| Haze value | 30.3 | 25.0 | 15.4 | 10.3 | 7.0 |
| Transmitted image clarity | 15.0 | 23.8 | 30.3 | 4.0 | 7.5 |

Figure 6:
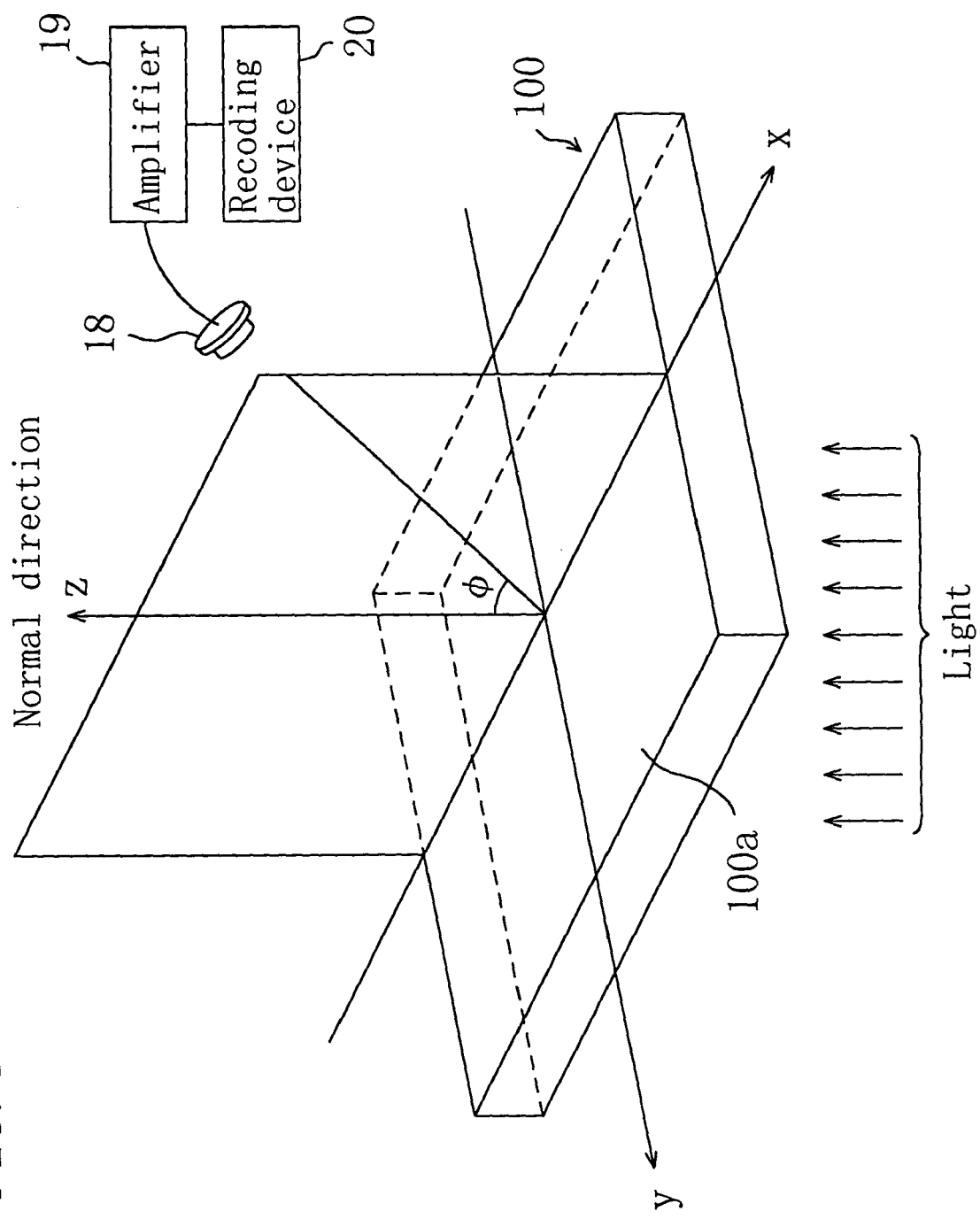
FIG. 6 is a perspective view illustrating an evaluation system for evaluating a vertical angle dependence of a liquid crystal display device.

For Samples A31 to A33 and Reference Samples A401 and A402, the viewing angle characteristic of each of the liquid crystal display devices was evaluated with a measurement system as illustrated in FIG. 6.

The viewing angle characteristic evaluation system illustrated in FIG. 6 includes a light receiving element 18, an amplifier 19 and a recoding device 20. In this measurement system, a viewer side surface 10a of the liquid crystal display device 100 is arranged so as to be parallel to the xy plane of the rectangular coordinate system xyz (the rectangular coordinate system of this measurement system coincides with the xyz coordinate system illustrated in FIG. 2).

The light receiving element 18 for receiving light at a fixed light-receiving solid angle is arranged at a distance from the origin of coordinates at an angle ø (vertical angle) with respect to the z-axis direction, which is normal to the viewer side surface 100a of the liquid crystal display device 100. In measurement, the opposite surface to the viewer side surface 10a of the liquid crystal display device 100, placed in the measurement system, is irradiated with monochromatic light having a wavelength of 550 nm. Thus, a portion of the monochromatic light transmitted through the liquid crystal display device 100 is incident upon the light receiving element 18. After the output of the light receiving element 18 is amplified to a predetermined level in the amplifier 19, the amplified output is recorded by the recoding device 20 which is provided with a waveform memory, a recorder, etc.

Samples A31 to A33 of Embodiment 3 and Reference Samples A401 and A402 were placed in the measurement system for the measurement of the relationship between the applied voltage to each liquid crystal display device and the output level of the light receiving element 18 with the light receiving element 18 being fixed at the angle ø. The light receiving element 18 was arranged so that the angle ø was 50°. Assuming that the x-axis direction to be the downward direction in the display plane (the normal viewing direction) and the y-axis direction to be the leftward direction in the display plane, the measurement was performed while moving the light receiving element 18 in the upward direction (the counter normal viewing direction) and in the horizontal directions.

Figure 7A:
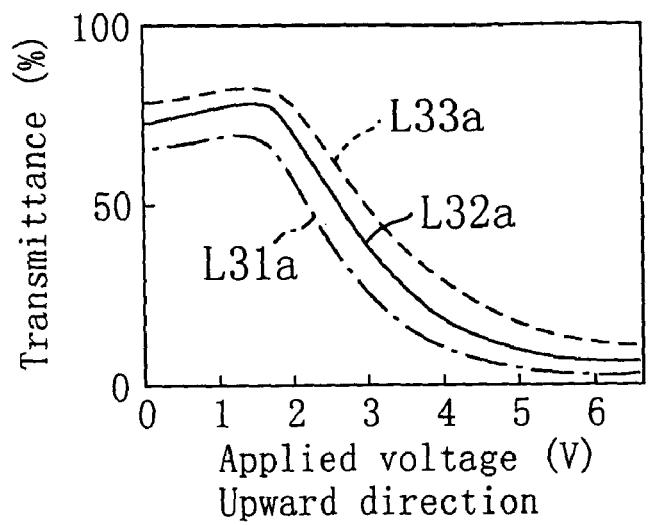
FIG. 7A, 7B, and 7C are graphs illustrating applied voltage versus transmittance characteristics of liquid crystal display devices according to Embodiment 3.
Figure 7B:
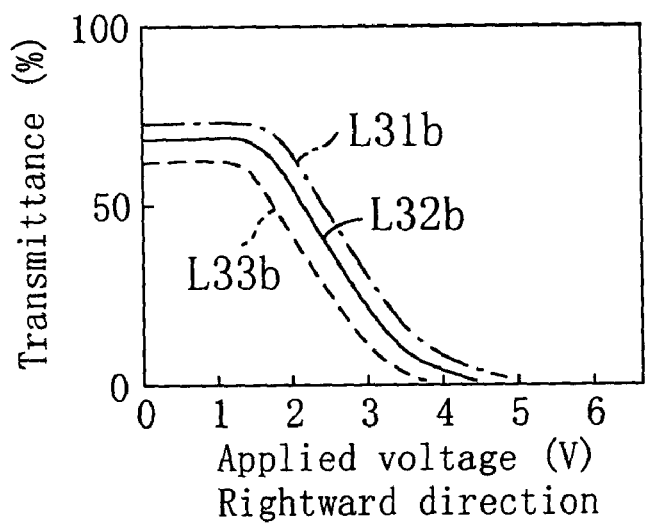
Figure 7C:
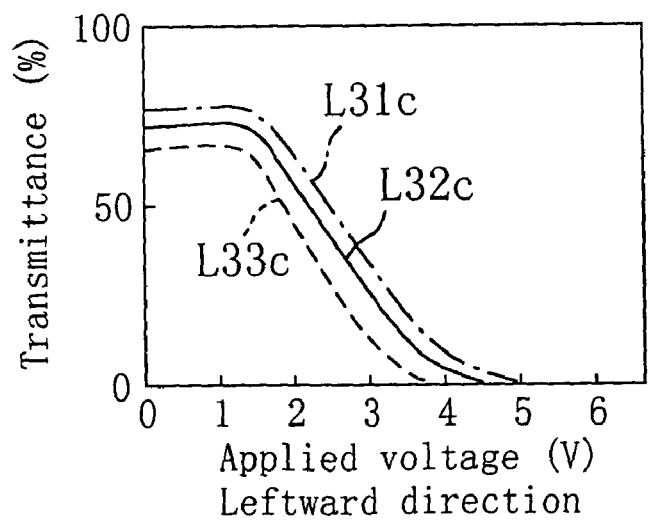
Figure 8A:
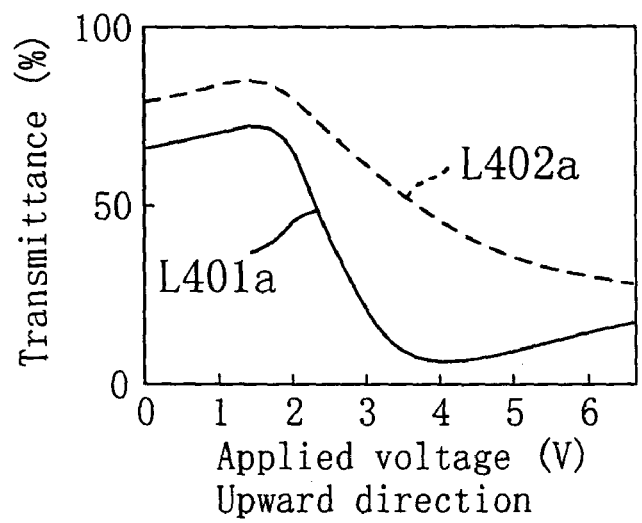
FIG. 8A, 8B, and 8C are graphs illustrating applied voltage versus transmittance characteristics of liquid crystal display devices of reference examples.
Figure 8B:
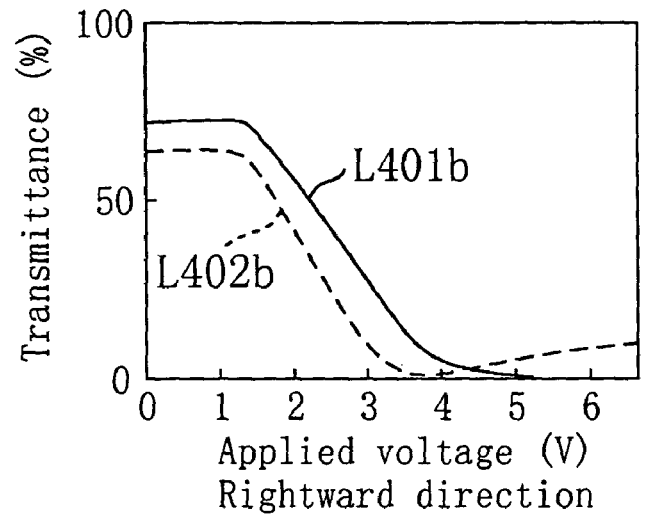
Figure 8C:
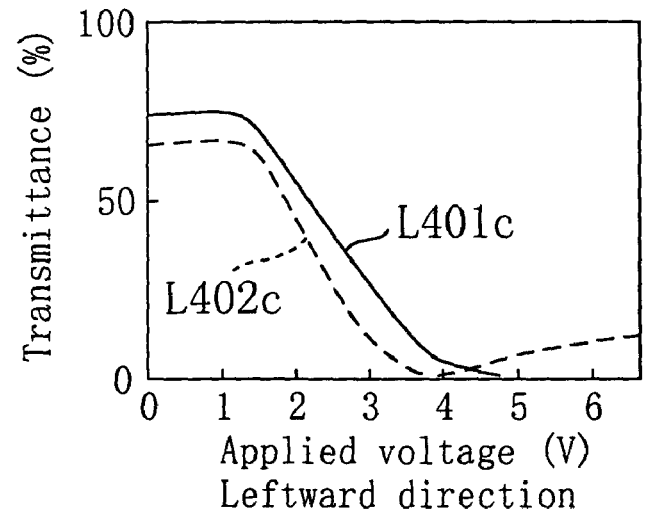

FIG. 7A to FIG. 7C show the results of the measurement for Samples A31 to A33 of the present embodiment, and FIG. 8A to FIG. 8C show the results of the measurement for Reference Samples A401 and A402. Each of FIG. 7A to FIG. 7C and FIG. 8A to FIG. 8C is a graph illustrating the optical transmittance with respect to the voltage applied to the liquid crystal display device (the applied voltage versus transmittance characteristics). FIG. 7A and FIG. 8A show the results of a measurement from the upward direction, FIG. 7B and FIG. 8B show the results of a measurement from the rightward direction, and FIG. 7C and FIG. 8C show the results of a measurement from the leftward direction.

In FIG. 7A to FIG. 7C, one-dot-chain line curves L31a, L31b and L31c show the results for Sample A31 which uses a liquid crystal material of Δn(550)=0.070 for the liquid crystal layer 8, solid line curves L32a, L32b and L32c show the results for Sample A32 which uses a liquid crystal material of Δn(550)=0.080 for the liquid crystal layer 8, and broken line curves L33a, L33b and L33c show the results for Sample A33 which uses a liquid crystal material of Δn(550)=0.095 for the liquid crystal layer 8. In FIG. 8A to FIG. 8C, solid line curves L401a, L401b and L401c show the results for Reference Sample A401 which uses a liquid crystal material of Δn(550)=0.060 for the liquid crystal layer 8, and broken line curves L402a, L402b and L402c show the results for Reference Sample A402 which uses a liquid crystal material of Δn(550)=0.120 for the liquid crystal layer 8.

For the applied voltage versus transmittance characteristics in the upward direction, it was confirmed that the transmittance of Samples A31 to A33 of the present embodiment sufficiently decreases as the voltage increases as indicated by L31a, L32a and L33a in FIG. 7A. In contrast, the transmittance of Reference Sample A402 did not sufficiently decrease as the voltage increases as indicated by L402a in FIG. 8A, and the contrast ratio inversion phenomenon was observed in Reference Sample A401, with the transmittance thereof once decreasing and then increasing again as the voltage increases as indicated by L401a in FIG. 8A.

Similarly, for the applied voltage versus transmittance characteristics in the rightward direction, it was confirmed that the transmittance of Samples A31 to A33 of the present embodiment decreases to a substantially zero value as the voltage increases as indicated by L31b, L32b and L33b in FIG. 7B. The transmittance of Reference Sample A401 decreases to a substantially zero value as the voltage increases as indicated by L401b in FIG. 8B. However, the contrast ratio inversion phenomenon was observed in Reference Sample A402, with the transmittance thereof once decreasing and then increasing again as the voltage increases as indicated by L402b in FIG. 8B.

Similarly, for the applied voltage versus transmittance characteristics in the leftward direction, it was confirmed that the transmittance of Samples A31 to A33 of the present embodiment decreases to a substantially zero value as the voltage increases as indicated by L31c, L32c and L33c in FIG. 7C. The transmittance of Reference Sample A401 decreases to a substantially zero value as the voltage increases as indicated by L401c in FIG. 8C. However, the contrast ratio inversion phenomenon was observed in Reference Sample A402, with the transmittance thereof once decreasing and then increasing again as the voltage increases as indicated by L402c in FIG. 8C.

It can be seen from the results shown above that in the liquid crystal display devices of Reference Samples A401 and A402 in which the refractive index anisotropy Δn(550) of the liquid crystal material of the liquid crystal layer 8 for light having a wavelength of 550 nm was set to be 0.060 and 0.120, respectively, the inversion phenomenon occurs or the transmittance in the presence of an applied voltage does not sufficiently decrease as shown in FIG. 8A to FIG. 8C. Thus, with these liquid crystal display devices, a practically sufficient display quality cannot be obtained.

The results of a study on the influence of the retardation value of the liquid crystal layer 8 on the viewing angle characteristic of the liquid crystal display device 100 using the antiglare layer 16 having a haze value equal to or greater than 40 will be discussed below.

Samples B31 to B33 were produced in a manner similar to that for Samples A31 to A33 of the embodiment described above, and Reference Samples B401 and B402 were produced in a manner similar to that for Reference Samples A401 and A402 described above, except that the antiglare layer 16 was different from those used in the previous samples. Table 12 shows the haze values and transmitted image clarity values of the antiglare layers 16 of these samples.

TABLE 12

| Sample | B31 | B32 | B33 | B401 | B402 |
|---|---|---|---|---|---|
| Haze value | 41.0 | 50.1 | 70.8 | 10.5 | 35.3 |
| Transmitted image clarity | 28.0 | 20.4 | 15.2 | 3.4 | 5.9 |
| nm | 1.50 | 1.48 | 1.50 | 1.50 | 1.50 |
| np | 1.47 | 1.43 | 1.40 | 1.50 | 1.50 |
| \|nm-np\| | 0.03 | 0.05 | 0.10 | 0.00 | 0.00 |

The antiglare layer 16 used herein is obtained by dispersing plastic beads having a scattering center in a polymer matrix. Table 12 shows the refractive index nm of the polymer matrix of the antiglare layer 16 used in the samples, the refractive index np of the plastic beads and the absolute value of the difference therebetween.

For Samples B31 to B33 and Reference Samples B401 and B402, the applied voltage versus transmittance characteristics of the liquid crystal display devices were measured in a manner similar to that described above with the measurement system as illustrated in FIG. 6 so as to evaluate the viewing angle characteristics of the samples. For Samples B31 to B33, the results as shown in FIG. 7A to FIG. 7C were obtained, as for Samples A31 to A33. For Reference Samples B401 and B402, the results as shown in FIG. 8A to FIG. 8C were obtained, as for Reference Samples A401 and A402.

It can be seen from the results shown above that in the liquid crystal display devices of Reference Samples B401 and B402 in which the refractive index anisotropy Δn(550) of the liquid crystal material of the liquid crystal layer 8 for light having a wavelength of 550 nm is set to be 0.060 and 0.120, respectively, the inversion phenomenon occurs or the transmittance in the presence of an applied voltage does not sufficiently decrease as shown in FIG. 8A to FIG. 8C, even though an antiglare layer having a haze value equal to or greater than 40 is used. Thus, with these liquid crystal display devices, a practically sufficient display quality cannot be obtained. In the liquid crystal display devices of Samples B31 to B33 using an antiglare layer having a haze value equal to or greater than 40, the gray level inversion phenomenon was suppressed even in the normal viewing direction, thereby exhibiting a desirable viewing angle characteristic.

Table 13 below shows the results of a measurement of chromaticity value for Samples B31 to B33 and Reference Sample B401. The chromaticity values were measured with the apparatus mentioned above.

TABLE 13

| Sample | B31 | B32 | B33 | B401 |
|---|---|---|---|---|
| x | 0.3606 | 0.3578 | 0.3504 | 0.3696 |
| y | 0.3656 | 0.3649 | 0.3561 | 0.3710 |

As can be seen from Table 13, Samples B31 to B33 have chromaticity values x and y smaller than those of Reference Sample B401 by 0.0090 or more and 0.0054 or more, respectively, indicating that the yellowish coloring is suppressed for these samples. Various studies have revealed that the coloring phenomenon can be suppressed by employing an internal scattering layer which is obtained by dispersing particles having a scattering center in a matrix, with the refractive index of the particles being different from that of the matrix.

The dependence of the applied voltage versus transmittance characteristics on the inclination angle θ (see FIG. 2) was examined using the liquid crystal display devices 100 having respective antiglare layers whose haze values were equal to or greater than 15 and equal to or greater than 40, respectively. The dependence was examined while changing the inclination angle θ (see FIG. 2) of the index ellipsoid of the phase compensation plates 2 and 3 of each liquid crystal display device 100. As a result, it was found that when the inclination angle θ is in the range of 15° θ 75°, the optical compensation effect of the phase compensation plates 2 and 3 on the liquid crystal layer 8 can be reliably obtained, whereby it is possible to realize a liquid crystal display device having a wide viewing angle. In contrast, with a phase compensation plate in which the inclination angle was less than 15° or greater than 75°, the viewing angle could not be widened, and a sufficient viewing angle characteristic could not be obtained. It was found that with a phase compensation plate in which the inclination angle was less than 15° or greater than 75°, the viewing angle was narrow particularly in the counter normal viewing direction.

The influence of the second retardation value, (na−nb)×d, on the viewing angle characteristic was examined while changing the second retardation value of the phase compensation plates 2 and 3 of the liquid crystal display device 100. As a result, it was found that when the value is equal to or greater than 80 nm and less than or equal to 250 nm, the optical compensation effect of the phase compensation plates 2 and 3 on the liquid crystal layer 8 can be reliably obtained, whereby it is possible to realize a liquid crystal display device having a wide viewing angle. In contrast, it was found that with a phase compensation plate in which the second retardation value (na−nb)×d was less than 80 nm or greater than 250 nm, the viewing angle was narrow particularly in the horizontal directions.

While two phase compensation plates 2 and 3 are provided on opposing sides of the liquid crystal cell 1 in the embodiments described above, it is possible to obtain a viewing angle characteristic as described above even when only one of the phase compensation plates 2 and 3 is provided on one side of the liquid crystal cell 1. However, if only one phase compensation plate is used, the viewing angle characteristic in the horizontal direction may be asymmetric, though the viewing angle characteristic in the vertical direction is improved in a well-balanced manner. In contrast, when two phase compensation plates are provided, the viewing angle characteristic in the vertical direction is improved as much as when only one phase compensation plate is used, while the viewing angle characteristic in the horizontal direction is symmetric, thereby improving the viewing angle characteristic both in the horizontal direction and in the vertical direction. Where two phase compensation plates are provided, the phase compensation plates may alternatively be provided on the same side of the liquid crystal cell 1 on top of each other. Alternatively, three or more phase compensation plates may be used.

The phase compensation element capable of providing the effect of the present invention is not limited to any particular phase compensation element illustrated in the embodiments described above. While a phase compensation element suitable for use with a liquid crystal layer having a positive uniaxial optical anisotropy (TN or STN mode) is described in the embodiments described above, any other phase compensation element may be selected according to the display mode of the liquid crystal display device to be employed so that the vertical angle dependence can be compensated for by the phase compensation element. For example, a phase compensation element in which the principal axis of the index ellipsoid is substantially parallel to the direction normal to the surface of the phase compensation element may be used. The phase compensation element capable of providing the effect of the present invention is not limited to a phase compensation element having a negative uniaxial optical anisotropy. Alternatively, a phase compensation element having a positive optical anisotropy, or a phase compensation element having a biaxial optical anisotropy may alternatively be used.

Moreover, the present invention is not limited to the TN mode or the STN mode, and can alternatively be used with any display mode in which an ON/OFF display operation is performed utilizing the electro-optical characteristics of a liquid crystal material.

As described above, the present invention provides a liquid crystal display device capable of displaying an image with a wide viewing angle and a desirable color reproducibility.

By providing an antiglare layer on the viewer side of a liquid crystal display device, and setting the specular reflection characteristic and the specular transmission characteristic of the antiglare layer in a desired range, it is possible to suppress the occurrence of coloring (yellowish coloring or bluish coloring) as viewed from an inclined direction, which is characteristic of an arrangement using a phase compensation plate, while suppressing the interobject reflection of reflected light and maintaining the clarity of an image formed by light transmitted in the normal direction at a high level. As a result, it is possible to realize a liquid crystal display device capable of displaying an image with a wide viewing angle and a high quality, and with no image coloring being observed in any direction.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. A liquid crystal display device which utilizes at least light from a backlight to display images, comprising:
    a liquid crystal cell, the liquid crystal cell including a pair of substrates and a liquid crystal layer provided between the pair of substrates, the liquid crystal cell receiving light from the backlight;
    a pair of polarizers provided so as to oppose each other via the liquid crystal cell therebetween;
    a phase compensation element provided between the liquid crystal cell and at least one of the pair of polarizers; and
    an antiglare layer provided on a viewer side of one of the pair of polarizers which is provided closer to a viewer;
    wherein the phase compensation element comprises indices of refraction na, nb and nc, and directions corresponding thereto, wherein na>nb and nc>nb, wherein the direction corresponding to nb is inclined with respect to a direction normal to the liquid crystal layer in at least part of the phase compensation element, and wherein a haze value of the antiglare layer is equal to or greater than 40, and a value of transmitted image clarity of the antiglare layer is equal to or greater than 15 as measured with an image clarity meter in which a width of an optical comb is 0.5 mm, and wherein the antiglare layer has an internal scattering layer and a scattering surface.

2. The liquid crystal display device of claim 1 wherein na is approximately equal to nc.

3. The liquid crystal display device of claim 1 wherein the phase compensation element comprises a discotic liquid crystal material in an inclined or hybrid orientation held in a matrix obtained by cross-linking an organic polymer, and wherein the antiglare layer is made of a single layer or a multi-layer structure.

4. The liquid crystal display device of claim 1 wherein the internal scattering layer includes a polymer matrix and particles dispersed in the polymer matrix, and a refractive index of the particles and a refractive index of the polymer matrix are different from each other.

5. The liquid crystal display device of claim 4 wherein the difference in the refractive index between the particles and the polymer matrix is within the range of 0.03 to 0.10 in its absolute value.

6. The liquid crystal display device of claim 1, wherein a refractive index anisotropy $\Delta n(550)$ of a liquid crystal material of the liquid crystal layer for light having a wavelength of 550 nm is in a range of $0.060 < \Delta n(550) < 0.120$.

7. The liquid crystal display device of claim 1, wherein the phase compensation element is arranged so that the direction corresponding to nb forms an angle in a range of 15 to 75 degrees with respect to the direction normal to the liquid crystal layer.

8. The liquid crystal display device of claim 1, wherein $(na-nb) \times d$ is in a range of 80 nm to 250 nm, where d denotes a thickness of the phase compensation element in the direction normal to the liquid crystal layer.

9. The liquid crystal display device of claim 1, wherein the liquid crystal layer is a twist orientation liquid crystal layer.

10. The liquid crystal display device of claim 1, wherein the phase compensation element includes a discotic liquid crystal material in an inclined or hybrid orientation.

11. The liquid crystal display device of claim 10, wherein a refractive index anisotropy $\Delta n(550)$ of a liquid crystal material of the liquid crystal layer for light having a wavelength of 550 nm is in a range of $0.060 < \Delta n(550) < 0.120$.

12. The liquid crystal display device of claim 10, wherein the phase compensation element is arranged so the direction of nb forms an angle in a range of 15 to 75 degrees with respect to the direction normal to the liquid crystal layer.

13. The liquid crystal display device of claim 10, wherein $(na-nb) \times d$ is in a range of 80 nm to 250 nm, where d denotes a thickness of the phase compensation element in the direction normal to the liquid crystal layer.

14. The liquid crystal display device of claim 1, wherein the phase compensation element comprises an index ellipsoid including the indices of refraction na, nb and nc which are orthogonal to one another.

15. The liquid crystal display device of claim 14, wherein the phase compensation element comprises a discotic layer including liquid crystal material, and wherein na, nb and nc are principal indices of the index ellipsoid.

16. The liquid crystal display device of claim 1, wherein said display includes first and second of said phase compensation elements on opposite sides of said liquid crystal layer.

17. A liquid crystal display device which utilizes at least light from a backlight in displaying images, the liquid crystal display comprising:
 a liquid crystal cell, the liquid crystal cell including a pair of substrates and a liquid crystal layer provided between the pair of substrates;
 a pair of polarizers provided so as to oppose each other via the liquid crystal cell therebetween;
 a phase compensation element provided between the liquid crystal cell and at least one of the pair of polarizers; and
 an antiglare layer provided on a viewer side of one of the pair of polarizers which is provided closer to a viewer,
 wherein a haze value of the antiglare layer is equal to or greater than 40, and a value of transmitted image clarity the antiglare layer is equal to or greater than 15 as measured with an image clarity meter in which a width of an optical comb is 0.5 mm, and wherein the antiglare layer has an internal scattering layer and a scattering surface, and
 wherein the phase compensation element includes a discotic liquid crystal material in an inclined or hybrid orientation in at least part of the phase compensation element.

18. The liquid crystal display device of claim 17, wherein the phase compensation element has an index ellipsoid which has three principal axes, a-axis, b-axis and c-axis, which are orthogonal to one another, and three principal orthogonal refractive indices, na, nb and nc, and wherein na>nb, nc>nb, and wherein a direction corresponding to na is substantially parallel to a layer plane of the liquid crystal layer, and a direction corresponding to nb is inclined with respect to a layer normal of the liquid crystal layer in at least part of the compensation element.

19. The liquid crystal display device of claim 18, wherein the phase compensation element is arranged so that b-axis forms an angle in a range of 15 to 75 degrees with respect to a direction normal to the liquid crystal layer.

20. The liquid crystal display device of claim 18, wherein $(na-nb) \times d$ is in a range of 80 nm to 250 nm, where d denotes a thickness of the phase compensation element in a direction normal to the liquid crystal layer.

21. The liquid crystal display device of claim 18, wherein na is approximately equal to nc.

22. The liquid crystal display device of claim 17, wherein the phase compensation element comprises the discotic liquid crystal material in the inclined or hybrid orientation held in a matrix obtained by cross-linking an organic polymer.

23. The liquid crystal display device of claim 17, wherein the internal scattering layer includes a polymer matrix and particles dispersed in the polymer matrix, and a refractive index of the particles and a refractive index of the polymer matrix are different from each other.

24. The liquid crystal display device of claim 23, wherein the difference in the refractive index between the particles and the polymer matrix is within the range of 0.03 to 0.10 (absolute value).

25. The liquid crystal display device of claim 17, wherein a refractive index anisotropy $\Delta n(550)$ of a liquid crystal material of the liquid crystal layer for light having a wavelength of 550 nm is in a range of $0.060 < \Delta n(550) < 0.120$.

26. The liquid crystal display device of claim 17, wherein the liquid crystal layer is a twist orientation liquid crystal layer.

27. The liquid crystal display device of claim 17, wherein the phase compensation element is arranged so that the direction of nb forms an angle in a range of 15 to 75 degrees with respect to a direction normal to the liquid crystal layer.

28. The liquid crystal display device of claim 27, wherein a refractive index anisotropy $\Delta n(550)$ of a liquid crystal material of the liquid crystal layer for light having a wavelength of 550 nm is in a range of $0.060 < \Delta n(550) < 0.120$.

29. The liquid crystal display device of claim 17, wherein $(na-nb) \times d$ is in a range of 80 nm to 250 nm, where d denotes a thickness of the phase compensation element in a direction normal to the liquid crystal layer.

* * * * *